(12) United States Patent (10) Patent No.: US 9,414,001 B2
Yanagidate (45) Date of Patent: Aug. 9, 2016

(54) IMAGE PICK-UP AND DISPLAY SYSTEM, IMAGE PICK-UP DEVICE, IMAGE PICK-UP METHOD, AND COMPUTER READABLE STORAGE DEVICE

(71) Applicant: OLYMPUS CORPORATION, Tokyo (JP)

(72) Inventor: Masaharu Yanagidate, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/679,567

(22) Filed: Apr. 6, 2015

(65) Prior Publication Data

US 2015/0215563 A1 Jul. 30, 2015

Related U.S. Application Data

(63) Continuation of application No. PCT/JP2013/068662, filed on Jul. 8, 2013.

(30) Foreign Application Priority Data

Oct. 9, 2012 (JP) ................................. 2012-224245

(51) Int. Cl.
H04N 5/04 (2006.01)
H04N 5/38 (2006.01)
(Continued)

(52) U.S. Cl.
CPC . *H04N 5/38* (2013.01); *H04N 5/04* (2013.01); *H04N 5/0733* (2013.01);
(Continued)

(58) Field of Classification Search
CPC ..... H04N 5/772; H04N 5/222; H04N 5/9201; H04N 5/9264; H04N 5/2329; H04N 5/23293; H04N 5/3532; H04N 7/181; H04N 1/00127; H04N 2101/00; H04N 2201/0084; H04N 5/2258; H04N 5/232; H04N 5/23206; H04N 5/23212; H04N 5/23245; H04M 1/7253; H04M 2250/52
See application file for complete search history.

(56) References Cited

U.S. PATENT DOCUMENTS 7,868,916 B2 * 1/2011 Kawashima ....... H04N 1/00137
348/207.2
8,264,563 B2 * 9/2012 Kaneko .................. H04N 5/265
348/222.1
(Continued)

FOREIGN PATENT DOCUMENTS

EP 0 777 363 A2 6/1997
JP 2003-324649 A 11/2003
(Continued)

OTHER PUBLICATIONS

International Search Report dated Sep. 10, 2013, issued in corresponding application No. PCT/JP2013/068662.
(Continued)

*Primary Examiner* — Golam Sorowar
(74) *Attorney, Agent, or Firm* — Westerman, Hattori, Daniels & Adrian, LLP

(57) ABSTRACT

An image pick-up and display system has a plurality of image pick-up devices and a display device. The image pick-up devices, other than a reference image pick-up device, have a control unit that performs the following: storing time relationship data indicating the time relationship between the image pick-up timing of the reference image pick-up device and the wireless transmission timing of compressed image data of the reference image pick-up device; adjusting the image pick-up timing of an image pick-up unit, on the basis of the time relationship data and the reception timing of the compressed image data that was wirelessly received by a first wireless communication unit, so as to match the image pick-up timing of the reference image pick-up device; and adjusting the wireless transmission timing of the first wireless communication unit so that the timing differs from the wireless transmission timing of the reference image pick-up device.

7 Claims, 10 Drawing Sheets

(51) Int. Cl.
*H04N 5/232* (2006.01)
*H04N 5/917* (2006.01)
*H04N 5/247* (2006.01)
*H04N 5/073* (2006.01)
*H04N 21/43* (2011.01)

(52) U.S. Cl.
CPC .......... *H04N 5/23206* (2013.01); *H04N 5/247* (2013.01); *H04N 5/917* (2013.01); *H04N 21/4305* (2013.01); *H04N 21/4307* (2013.01)

(56) References Cited

U.S. PATENT DOCUMENTS

| | | | | |
|---|---|---|---|---|
| 2001/0022624 | A1* | 9/2001 | Tanaka | H04N 1/00137 348/333.02 |
| 2002/0118958 | A1 | 8/2002 | Ishikawa et al. | |
| 2002/0135682 | A1 | 9/2002 | Oka et al. | |
| 2003/0067872 | A1 | 4/2003 | Harrell et al. | |
| 2004/0032495 | A1 | 2/2004 | Ortiz | |
| 2005/0120381 | A1* | 6/2005 | Yamaguchi | H04N 1/42 725/105 |
| 2006/0085534 | A1* | 4/2006 | Ralston | H03M 7/40 709/223 |
| 2009/0021583 | A1* | 1/2009 | Salgar | H04N 7/181 348/159 |
| 2009/0115854 | A1* | 5/2009 | Hio | H04N 5/23203 348/207.1 |
| 2009/0303337 | A1* | 12/2009 | Kaneko | H04N 5/265 348/222.1 |
| 2012/0154510 | A1* | 6/2012 | Huitema | H04N 5/23222 348/14.03 |
| 2012/0274856 | A1* | 11/2012 | Kumar | G09G 5/14 348/660 |
| 2013/0250120 | A1* | 9/2013 | Ooi | H04N 7/181 348/159 |

FOREIGN PATENT DOCUMENTS

| | | |
|---|---|---|
| JP | 2008-301146 A | 12/2008 |
| JP | 4466052 B2 | 5/2010 |

OTHER PUBLICATIONS

Extended (Supplementary) European Search Report dated Mar. 4, 2016, issued in counterpart European Application No. 13845016.8 (9 pages).

* cited by examiner

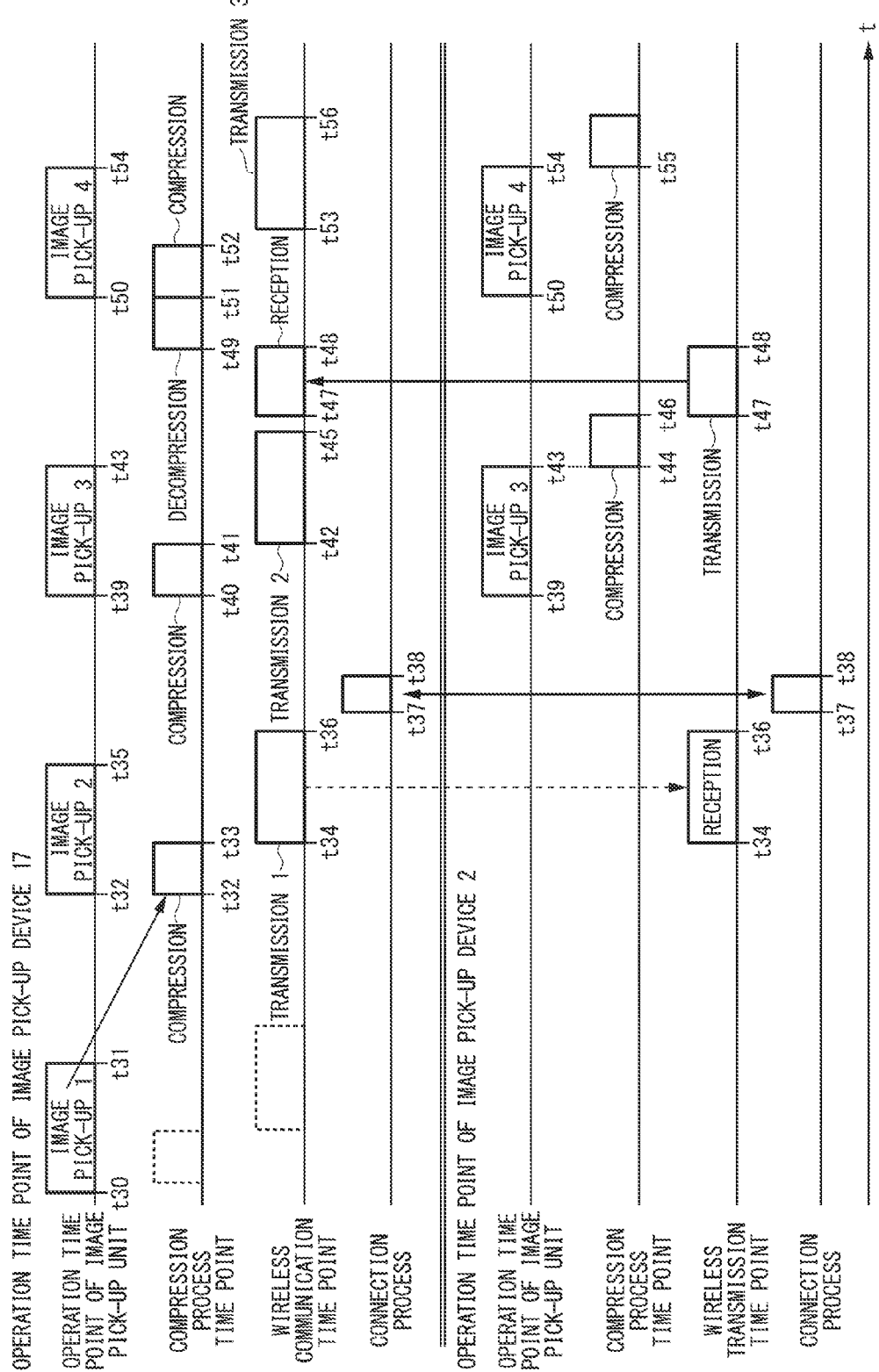

IMAGE PICK-UP AND DISPLAY SYSTEM, IMAGE PICK-UP DEVICE, IMAGE PICK-UP METHOD, AND COMPUTER READABLE STORAGE DEVICE

CROSS REFERENCE TO RELATED APPLICATIONS

This application is a continuation application based on a PCT Patent Application No. PCT/JP2013/068662, filed Jul. 8, 2013, whose priority is claimed on Japanese Patent Application No. 2012-224245, filed Oct. 9, 2012, the entire content of which are hereby incorporated by reference.

BACKGROUND OF THE INVENTION

1. Field of the Invention

The present invention relates to an image pick-up and display system that has a plurality of image pick-up devices that wirelessly transmit picked up image data and at least one display device that receives the image data to display images.

2. Description of the Related Art

In recent years, in a system that has a plurality of image pick-up devices, arrangement of image pick-up timings of the image pick-up devices with external synchronization signals supplied to the image pick-up devices in a wired manner has been performed. For example, the technology of causing a plurality of cameras in a TV studio to be synchronized with one another is an example thereof.

In addition, as a method for controlling image pick-up timings of image pick-up devices that perform wireless transmission, for example, Japanese Patent Publication No. 4466052 discloses that respective image pick-up devices are periodically notified of information for being in synchronization through broadcast communication to operate based on the notified information, and thereby image pick-up timings thereof are controlled.

As the number of pixels in display devices has increased in recent years, multi-screen display in which images from a plurality of image pick-up devices are displayed on the same screen and panorama display in which images from a plurality of image pick-up devices are connected for display have been performed. In work fields for non-destructive inspection, for example, relevant inspection spots can be observed at the same time by displaying images of the inside of a structure that have been picked up by a plurality of image pick-up devices on the same screen side by side.

SUMMARY

According to a first aspect of the present invention, an image pick-up and display system has a plurality of image pick-up devices each of which executes image pick-up in a predetermined image pick-up cycle, and generates image pick-up data and wirelessly transmits compressed image data that corresponds to the image pick-up data each time image pick-up is performed and a display device which wirelessly receives the wirelessly transmitted compressed image data and displays an image based on the compressed image data, when one of the plurality of image pick-up devices is defined as a benchmark image pick-up device, the benchmark image pick-up device has an image pick-up section which executes image pick-up in a predetermined image pick-up cycle, and generates and outputs the image pick-up data each time image pick-up is performed, a data processing section which generates the compressed image data from the image pick-up data output from the image pick-up section, and a first wireless communication section which wirelessly transmits the compressed image data generated by the data processing section in a predetermined transmission cycle, the image pick-up device other than the benchmark image pick-up device has the image pick-up section, the data processing section, the first wireless communication section which further wirelessly receives the compressed image data wirelessly transmitted from the benchmark image pick-up device, and a control section which stores temporal relation data that indicates a temporal relation between an image pick-up timing of the benchmark image pick-up device and a wireless transmission timing of the compressed image data of the benchmark image pick-up device, adjusts an image pick-up timing of the image pick-up section so that the timing matches the image pick-up timing of the benchmark image pick-up device and adjusts a wireless transmission timing of the first wireless communication section so that the timing is different from the wireless transmission timing of the benchmark image pick-up device based on the temporal relation data and a reception timing of the compressed image data wirelessly received by the first wireless communication section, and the display device has a second wireless communication section which wirelessly receives the compressed image data wirelessly transmitted from the image pick-up device, and a display section which displays an image based on the compressed image data wirelessly received by the second wireless communication section in a predetermined display cycle.

According to a second aspect of the present invention, in the image pick-up and display system according to the first aspect, the first wireless communication section of the benchmark image pick-up device may wirelessly receive, from the display device, reception completion data representing that the image pick-up data corresponding to one time of image pick-up has been wirelessly received by the display device, when the reception completion data has been received by the first wireless communication section after the one time of image pick-up has been performed, the image pick-up section of the benchmark image pick-up device may perform next image pick-up, the display device may further have a computation section that computes an adjustment time of an image pick-up timing of the image pick-up section of the benchmark image pick-up device based on a display timing at which the image pick-up data corresponding to the one time of image pick-up of the image pick-up section of the benchmark image pick-up device is displayed by the display section and a reception timing of the image pick-up data wirelessly received by the second wireless communication section, and the second wireless communication section may wirelessly transmit the reception completion data to the benchmark image pick-up device at a timing according to the computed adjustment time.

According to a third aspect of the present invention, in the image pick-up and display system according to the second aspect, the second wireless communication section of the display device may wirelessly transmit, to the benchmark image pick-up device, data representing successful reception of a wireless packet that has been finally wirelessly transmitted from the benchmark image pick-up device among wireless packets including divided image pick-up data obtained by dividing the image pick-up data corresponding to the one time of image pick-up of the image pick-up section of the benchmark image pick-up device into a plurality of pieces, as the reception completion data.

According to a fourth aspect of the present invention, in the image pick-up and display system according to the third aspect, the second wireless communication section of the display device may wirelessly transmit ACK data to the benchmark image pick-up device as the reception completion data.

According to a fifth aspect of the present invention, in the image pick-up and display system according to the fourth aspect, after successfully wirelessly receiving the wireless packet that has been finally wirelessly transmitted from the benchmark image pick-up device, the second wireless communication section of the display device may wirelessly transmit NAC data to the benchmark image pick-up device each time the wireless packet re-transmitted from the benchmark image pick-up device is received until the ACK data is wirelessly transmitted.

According to a sixth aspect of the present invention, in the image pick-up and display system according to the first aspect, the first wireless communication section of the image pick-up device other than the benchmark image pick-up device may wirelessly transmit the image pick-up data to the benchmark image pick-up device, the benchmark image pick-up device may further have an image combining section that combines the image pick-up data output from the image pick-up section and the image pick-up data wirelessly received by the first wireless communication section, and the first wireless communication section of the benchmark image pick-up device may wirelessly receive the image pick-up data wirelessly transmitted from the image pick-up device other than the benchmark image pick-up device and wirelessly transmit the image pick-up data combined by the image combining section to the display device.

According to a seventh aspect of the present invention, in the image pick-up and display system according to the sixth aspect, the image combining section of the benchmark image pick-up device may combine the image pick-up data output from the image pick-up section and the image pick-up data wirelessly received by the first wireless communication section within the same period as the image pick-up cycle in which the former image pick-up data is generated.

According to an eighth aspect of the present invention, an image pick-up device has an image pick-up section that executes image pick-up in a predetermined image pick-up cycle and generates and outputs image pick-up data each time image pick-up is performed, a data processing section that generates compressed image data from the image pick-up data output from the image pick-up section, a wireless communication section that wirelessly transmits the compressed image data generated by the data processing section in a predetermined transmission cycle and wirelessly receives the compressed image data wirelessly transmitted from another image pick-up device that has the image pick-up section and the data processing section, and a control section that stores temporal relation data representing a temporal relation between an image pick-up timing of the other image pick-up device and a wireless transmission timing of the compressed image data of the other image pick-up device, adjusts an image pick-up timing of the image pick-up section so that the timing matches the image pick-up timing of the other image pick-up device, and adjusts a wireless transmission timing of the wireless communication section so that the timing is different from the wireless transmission timing of the other image pick-up device based on the temporal relation data and a reception timing of the compressed image data wirelessly received by the wireless communication section.

According to a ninth aspect of the present invention, in the image pick-up device according to the eighth aspect, the wireless communication section may wirelessly transmit the compressed image data generated by the data processing section to a display device that wirelessly receives the compressed image data from the other image pick-up device and displays an image based on the compressed image data.

According to a tenth aspect of the present invention, in the image pick-up device according to the ninth aspect, the wireless communication section may wirelessly transmit the compressed image data generated by the data processing section to the display device at the timing from when the compressed image data is wirelessly transmitted by the other image pick-up device to when next image pick-up is performed.

According to an eleventh aspect of the present invention, in the image pick-up device according to the eighth aspect, the wireless communication section may wirelessly transmit the compressed image data generated by the data processing section to the other image pick-up device.

According to a twelfth aspect of the present invention, in the image pick-up device according to the eleventh aspect, the wireless communication section may wirelessly transmit the compressed image data generated by the data processing section to the other image pick-up device at the timing from when image pick-up is performed by the other image pick-up device to when the compressed image data corresponding to the image pick-up is wirelessly transmitted.

According to a thirteenth aspect of the present invention, an image pick-up method is an image pick-up method performed by an image pick-up device that has an image pick-up section that executes image pick-up in a predetermined image pick-up cycle and generates and outputs image pick-up data each time image pick-up is performed, a data processing section that generates compressed image data from the image pick-up data output from the image pick-up section, a wireless communication section that wirelessly transmits the compressed image data generated by the data processing section in a predetermined transmission cycle, and a control section that controls the image pick-up section and the data processing section, the method having steps of, using the control section of the image pick-up device, causing the wireless communication section to wirelessly receive the compressed image data wirelessly transmitted from benchmark image pick-up device, and adjusting an image pick-up timing of the image pick-up section so that the timing matches an image pick-up timing of other image pick-up device and adjusting a wireless transmission timing of the wireless communication section so that the timing is different from a wireless transmission timing of the other image pick-up device based on temporal relation data representing a temporal relation between the image pick-up timing of the other image pick-up device and a wireless transmission timing of the compressed image data of the other image pick-up device, and a reception timing of the compressed image data wirelessly received by the wireless communication section.

According to a fourteenth aspect of the present invention, a computer readable storage device saving a computer program causes a computer of an image pick-up device, which has an image pick-up section that executes image pick-up in a predetermined image pick-up cycle and generates and outputs image pick-up data each time image pick-up is performed, a data processing section that generates compressed image data from the image pick-up data output from the image pick-up section, a wireless communication section that wirelessly transmits the compressed image data generated by the data processing section in a predetermined transmission cycle, and a control section that controls the image pick-up section and the data processing section, to execute steps of causing the wireless communication section to wirelessly receive the compressed image data wirelessly transmitted from benchmark image pick-up device, and adjusting an image pick-up timing of the image pick-up section so that the timing matches an image pick-up timing of other image pick-up device and adjusting a wireless transmission timing of the wireless communication section so that the timing is different from a wireless transmission timing of the other image pick-up device based on temporal relation data representing a temporal relation between the image pick-up timing of the other image pick-up device and a wireless transmission timing of the compressed image data of the other image pick-up device, and a reception timing of the compressed image data wirelessly received by the wireless communication section.

BRIEF DESCRIPTION OF THE DRAWINGS

FIG. 12 is a timing chart representing an operation of the image pick-up device relating to image combining according to the second embodiment of the present invention.

DETAILED DESCRIPTION OF THE PREFERRED EMBODIMENTS

Hereinafter, embodiments of the present invention will be described with reference to the drawings.

First Embodiment

First, a first embodiment of the present invention will be described. In the present embodiment, an example in which the present invention is applied to an image pick-up and display system that is constituted by two image pick-up devices that transfer picked up images using wireless communication and one display device that receives and displays the wirelessly transferred images will be described.

Figure 1:
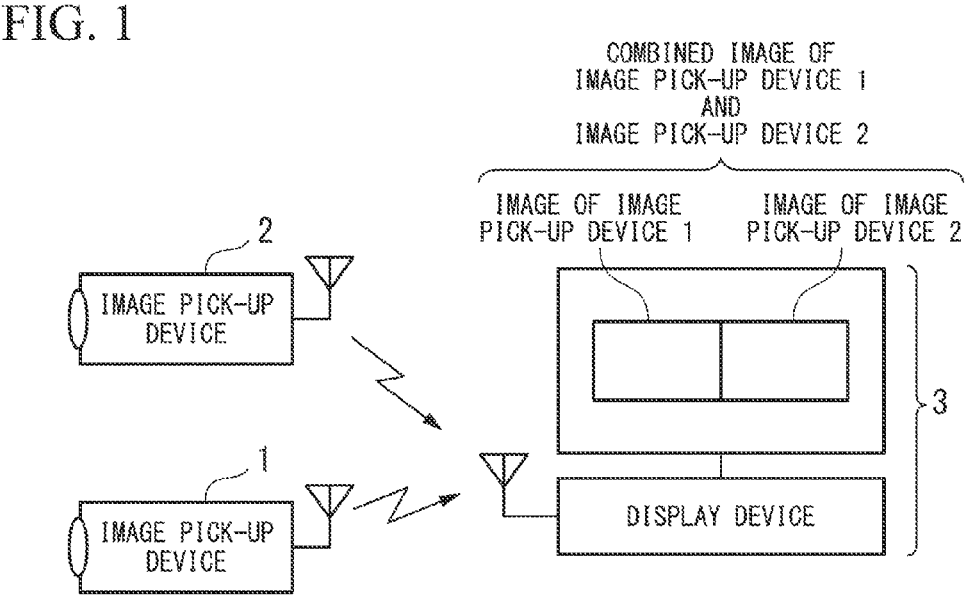
FIG. 1 is a block diagram representing a configuration of an image pick-up and display system according to a first embodiment of the present invention.

FIG. 1 represents a configuration of the image pick-up and display system according to the present embodiment. First, an overview of the image pick-up and display system will be described using FIG. 1. The image pick-up and display system illustrated in FIG. 1 is constituted by two image pick-up devices (an image pick-up device 1 and an image pick-up device 2) and one display device (a display device 3).

In the image pick-up devices, image pick-up data obtained from an image pick-up process undergoes a compression process and is converted into transmission data according to a predetermined protocol, and then the transmission data is wirelessly transmitted. The wirelessly transmitted transmission data is wirelessly received by the display device 3, the received data is processed to be decompressed and converted into display data, and thereby an image is displayed.

In the present embodiment, the display device 3 is connected to the two image pick-up devices, wirelessly receives transmission data wirelessly transmitted from the connection partners, and thereby displays an image on the same screen based on image pick-up data from the two image pick-up devices obtained from the received transmission data. An image pick-up device that is connected to the display device 3 first operates as a "master" that decides timings of image pick-up processes, and the other image pick-up device that is connected to the display device 3 later operates as a "slave" that matches its timings of image pick-up processes with the "master." In description of the present embodiment, the image pick-up device 1 is described as a "master" and the image pick-up device 2 is described as a "slave."

Figure 2:
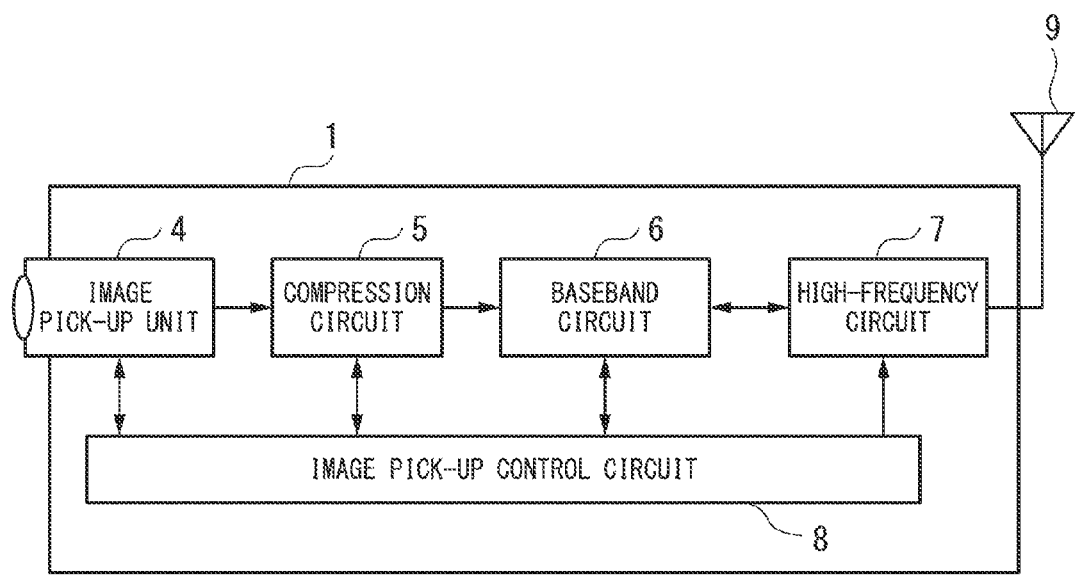
FIG. 2 is a block diagram representing a configuration of an image pick-up device that the image pick-up and display system according to the first embodiment of the present invention has.

FIG. 2 represents a configuration of the image pick-up device 1. Since a configuration of the image pick-up device 2 is the same as that of the image pick-up device 1, the configuration of the image pick-up device 1 will be described as a representative example. As illustrated in FIG. 2, the image pick-up device 1 is constituted by an image pick-up unit 4, a compression circuit 5, a baseband circuit 6, a high-frequency circuit 7, an image pick-up control circuit 8, and an antenna 9.

The image pick-up unit 4 generates image pick-up data by performing an image pick-up process in a predetermined image pick-up cycle, and outputs the image pick-up data. The image pick-up data is output from the image pick-up unit 4 in each image pick-up cycle. The compression circuit 5 compresses the image pick-up data output from the image pick-up unit 4 in a JPEG format, thereby generating compressed image data. The baseband circuit 6 performs a baseband process on the compressed image data output from the compression circuit 5, thereby converting the compressed image data to transmission data. The high-frequency circuit 7 performs a high-frequency process on the transmission data output from the baseband circuit 6, and then transmits the transmission data via the antenna 9. The antenna 9 wirelessly transmits the transmission data. The transmission data is wirelessly transmitted from the image pick-up device 1 in a predetermined transmission cycle. The image pick-up control circuit 8 controls operations of the image pick-up unit 4, the compression circuit 5, the baseband circuit 6, and the high-frequency circuit 7.

In addition, the image pick-up control circuit 8 stores a program and data necessary for controlling operations of the image pick-up control circuit 8. The function of the image pick-up device 1 is realized when the image pick-up control circuit 8 that is a computer of the image pick-up device 1 reads the program for controlling the operations of the image pick-up control circuit 8 for execution. In addition, the program for controlling the operations of the image pick-up control circuit 8 may be provided in a "computer readable recording medium," for example, a flash memory. Furthermore, the above-described program may be input to the image pick-up device 1 by being transmitted from a computer that stores the program in its storage device or the like to the image pick-up device 1 through a transmission medium or transmission waves of the transmission medium. Here, the "transmission medium" with which the program is transmitted refers to a medium having the function of transmitting information, including a network (communication network) such as the Internet or a communication link (communication line) such as a telephone line. In addition, the program described above may be one that realizes a part of the above-described function. Furthermore, it may be a so-called differential file (differential program) that can realize the above-described function in combination with a program that is recorded in the computer in advance.

Figure 3:
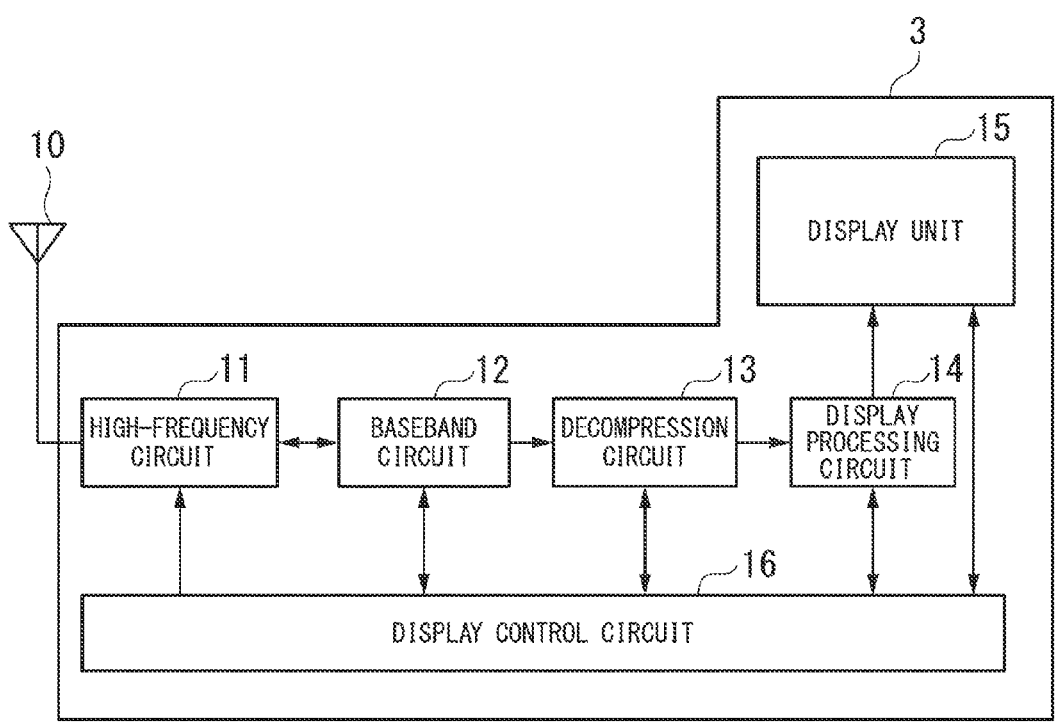
FIG. 3 is a block diagram representing a configuration of a display device that the image pick-up and display system according to the first embodiment of the present invention has.

FIG. 3 represents a configuration of the display device 3. As illustrated in FIG. 3, the display device 3 is constituted by an antenna 10, a high-frequency circuit 11, a baseband circuit 12, a decompression circuit 13, a display processing circuit 14, a display unit 15, and a display control circuit 16.

The antenna 10 receives transmission data that is wirelessly transmitted from the image pick-up devices 1 and 2. The high-frequency circuit 11 performs frequency conversion on the transmission data received via the antenna 10. The baseband circuit 12 performs a baseband process on the transmission data output from the high-frequency circuit 11, thereby reconfiguring the transmission data into compressed image data. The decompression circuit 13 decompresses the compressed image data output from the baseband circuit 12, thereby reconfiguring image pick-up data. The display processing circuit 14 converts the image pick-up data output from the decompression circuit 13 into display data to be used for displaying an image on the display unit 15. The display unit 15 displays the image based on the display data output from the display processing circuit 14. The display control circuit 16 controls operations of the high-frequency circuit 11, the baseband circuit 12, the decompression circuit 13, the display processing circuit 14, and the display unit 15.

Figure 4:
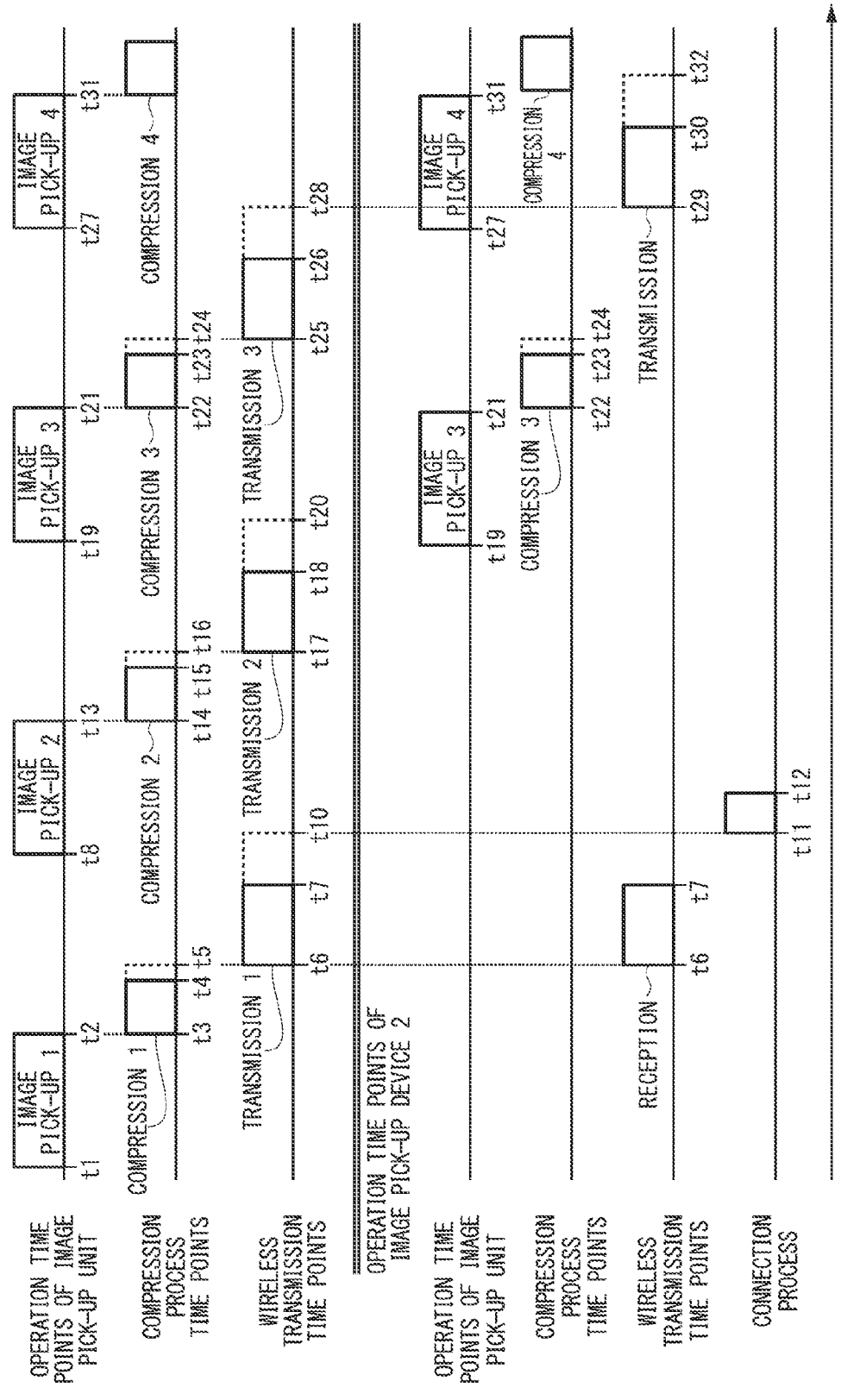
FIG. 4 is a timing chart representing an operation of the image pick-up device that the image pick-up and display system according to the first embodiment of the present invention has.

Next, an operation of the image pick-up devices 1 and 2 will be described. FIG. 4 represents operation timings of the image pick-up devices 1 and 2. The right direction of FIG. 4 is the direction in which time progresses. Hereinbelow, timings at which the image pick-up device 2 performs image pick-up and wireless transmission timings when, in a state in which the image pick-up device 1 and the display device 3 are connected to each other and wireless transmission of image pick-up data from the image pick-up device 1 is performed, the image pick-up device 2 is newly connected to the display device 3 will be described.

First, a state in which the image pick-up device 1 performs wireless transmission of image pick-up data will be described. An image pick-up operation of the image pick-up device 1 is performed in a predetermined cycle (T: 16.67 ms=1/60 seconds). The periods of t1 to t2, t8 to t13, t19 to t21, t27 to t31 of FIG. 4 each indicate a period in which the image pick-up unit 4 performs an image pick-up process. Because the predetermined image pick-up cycles are compartmentalized at the time points (t2, t13, t21, and t31) in the drawing at which each image pick-up process ends, the periods of t2 to t13, t13 to t21, and t21 to t31 are the predetermined image pick-up cycles. In addition, the head time points (t1, t8, t19, and t27) of the periods in which image pick-up processes are performed are variable according to an exposure period set in the image pick-up unit 4 by the image pick-up control circuit 8.

When each image pick-up process ends, the image pick-up data is transferred to the compression circuit 5 and then a compression process is performed. A time taken to perform the compression process varies according to states of the image pick-up data. The periods of t3 to t4, t14 to t15, and t22 to t23 in the drawing each indicate a period in which the compression circuit 5 performs the compression process. In addition, FIG. 4 illustrates maximum periods of the compression processes using dashed lines (t5, t16, and t24).

The compressed image data after the compression process is transferred to the baseband circuit 6, packetized using a predetermined communication protocol, and then wirelessly transmitted. In FIG. 4, periods in which the wireless communication is performed are indicated as periods of t6 to t7, t17 to t18, and t25 to t26. Although a wireless transmission processing time varies according to states of a communication path, communication stops in the present embodiment when a predetermined time has elapsed from start of the communication even when the state of the communication is poor and the communication has not ended. In FIG. 4, the time points indicated by dashed lines (t10, t20, and t28) are stop timings. When communication stops, the display device 3 responds to the stop of the communication by destroying data of the frame for which communication stops and continuing display of the image based on data of the previous frame.

Image pick-up data generated in the image pick-up process of the period of t1 to t2 ("Image pick-up 1") is processed to be compressed in the period of t3 to t4 ("Compression 1"), then compressed image data generated from the compression process is wirelessly transmitted in the period of t6 to t7 ("Transmission 1") as transmission data. Thereafter, the image pick-up processes ("Image pick-up 2," "Image pick-up 3," "Image pick-up 4," . . . ), the compression processes ("Compression 2," "Compression 3," "Compression 4," . . . ), and the wireless transmission ("Transmission 2," "Transmission 3," . . . ) are repeated periodically.

As illustrated, wireless transmission from the image pick-up device 1 is started from each time point (t6, t17, and t25) at which the maximum time of the compression process has elapsed. The timing control is performed by the image pick-up control circuit 8, and time points except for the head time points (t1, t8, t19, and t27) of the image pick-up processes which are changed according to an exposure time are fixed. In other words, as the time point (t6) of the start of the transmission of the image pick-up device 1 is detected, end time points (t2, t13, t21, and t31) of the image pick-up processes of the image pick-up device 1 and the time points at which transmission starts and ends (t6 to t10, t17 to t20, and t25 to t28) can be detected.

Next, an operation in which the image pick-up device 2 is connected to the display device 3 and performs wireless transmission while the image pick-up device 1 is performing wireless transmission will be described. Before starting connection to the display device 3, the image pick-up device 2 performs a wireless reception process to check a communication state of its periphery. Since the image pick-up device 1 performs wireless transmission in the present embodiment, the image pick-up device 2 checks wireless transmission (in the period from t6 to t7) of the image pick-up device 1. By detecting the time point (t6) of the start of the transmission of the image pick-up device 1 through the process, the image pick-up device 2 detects the image pick-up end time points (t2 and the like) and the transmission start and end time points (t6 and t10, and the like) of the image pick-up device 1.

To be specific, the image pick-up device 2 receives transmission data from the image pick-up device 1, and detects the image pick-up end time point (t2) and the transmission start and end time points (t6 and t10) of the image pick-up device 1 with reference to a time point at which the identifier (ID) that is included in the transmission data to indicate the image pick-up device 1 is received. The image pick-up control circuit 8 of the image pick-up device 2 stores the identifier indicating the image pick-up device 1 in advance, compares the identifier included in the transmission data to its stored identifier of the image pick-up device 1, and when they agree with each other, determines that the identifier indicating the image pick-up device 1 has been received.

The identifier is included in the header that is the leading part of a packet constituting the transmission data, and the position of the identifier is fixed in the transmission data. In addition, the image pick-up control circuit 8 of the image pick-up device 2 stores data (time relation data) that represents a temporal relation (for example, a time difference of respective time points) of respective image pick-up end time point (t2) and transmission start and end time points (t6 and t10) of the image pick-up device 1 in advance. The image pick-up control circuit 8 of the image pick-up device 2 detects the transmission start time point (t6) of the image pick-up device 1 which has been detected from the time point at which the identifier indicating the image pick-up device 1 has been received, and the image pick-up end time point (t2) and the transmission end time point (t10) of the image pick-up device 1 from the data stored in advance. Further, by computing time points by adding times of integral multiples of each cycle (T) to the image pick-up end time point (t2) and the transmission start and end time points (t6 and t10) of the image pick-up device 1, the image pick-up end time points (t13, t21, and t31) and the transmission start and end time points (t17 and t20, and t25 and t28) of the image pick-up device 1 can also be detected.

Although the timing detection method that uses the detection timing of the identifier (ID) of the image pick-up device 1 has been described in the present embodiment, data that is used in detection of a time point can be used as long as it is data that the image pick-up device 2 can detect and a transmission time point thereof is known. For example, an identifier that indicates the display device 3 as well as a marker that indicates the head of image pick-up data can also be used.

The image pick-up control circuit 8 of the image pick-up device 2 sets its image pick-up process end time points (t21 and t31) so that its image pick-up processes end at the time points calculated by adding times of integral multiples of a cycle (T) to the detected image pick-up process end time point (t2) of the image pick-up device 1, waits for the transmission end (t10) of the image pick-up device 1, and then starts a process of connecting to the display device 3 (t11). Thereby, the image pick-up processes of the image pick-up device 2 are executed at the same timings as the image pick-up processes of the image pick-up device 1.

In addition, the image pick-up control circuit 8 of the image pick-up device 2 sets compression process start time points (t22 and the like) according to the image pick-up process end time points. Furthermore, the image pick-up control circuit 8 of the image pick-up device 2 sets a wireless transmission timing (from t29 to t32) so that wireless transmission to the display device 3 is executed at the timing that is after the end of the image pick-up process and the compression process and after the transmission end time point (t28) of the image pick-up device 1. Thereby, wireless transmission of the image pick-up device 2 is executed at a different timing from wireless transmission of the image pick-up device 1.

Further, an operation timing checking process of the image pick-up device 1 is periodically performed by the image pick-up device 2 at times other than the time immediately after the start of connection, and thereby a slight gap between operation speeds of the image pick-up devices caused by unevenness of clocks inside the devices is corrected.

Figure 5:
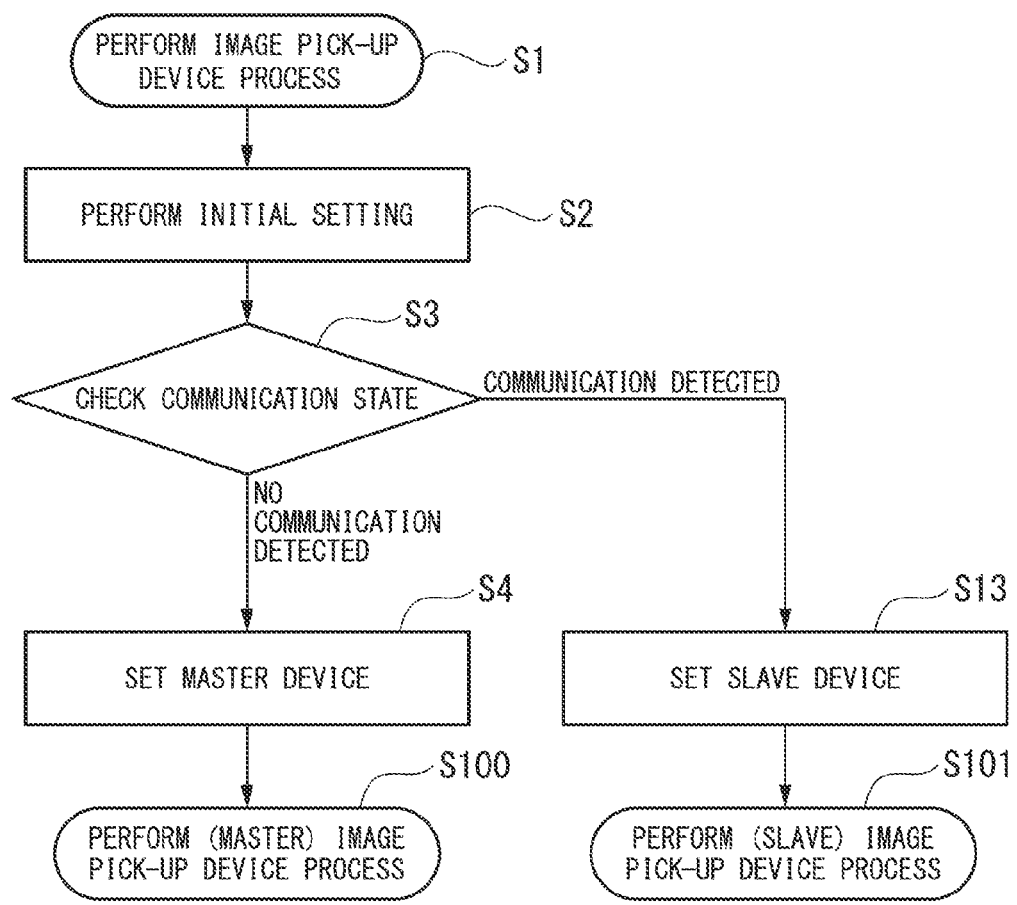
FIG. 5 is a flowchart representing the procedure of a common operation of an image pick-up device that the image pick-up and display system according to the first embodiment of the present invention has.
Figure 6:
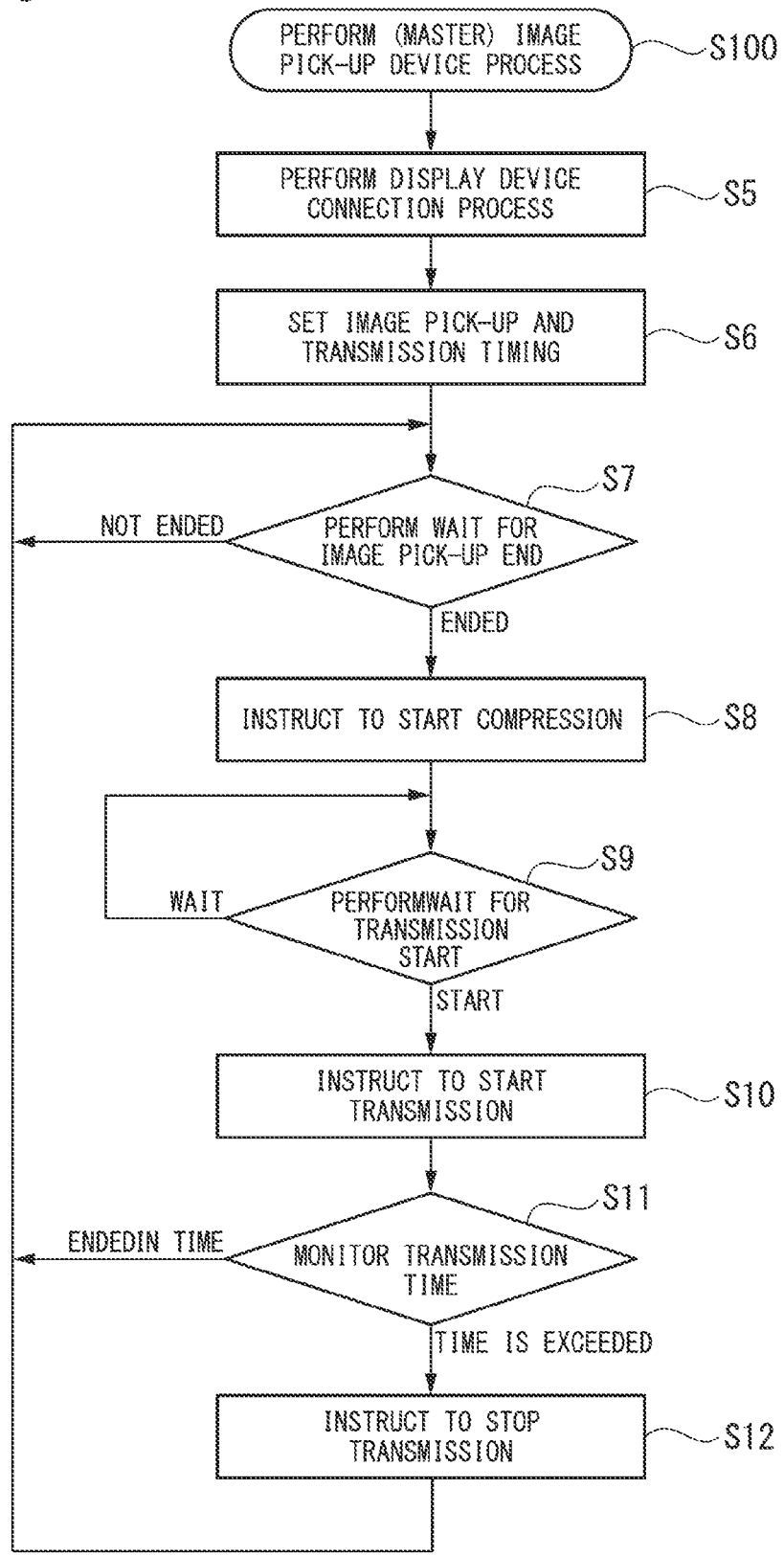
FIG. 6 is a flowchart representing the procedure of an operation of an image pick-up device that the image pick-up and display system according to the first embodiment of the present invention has.
Figure 7:
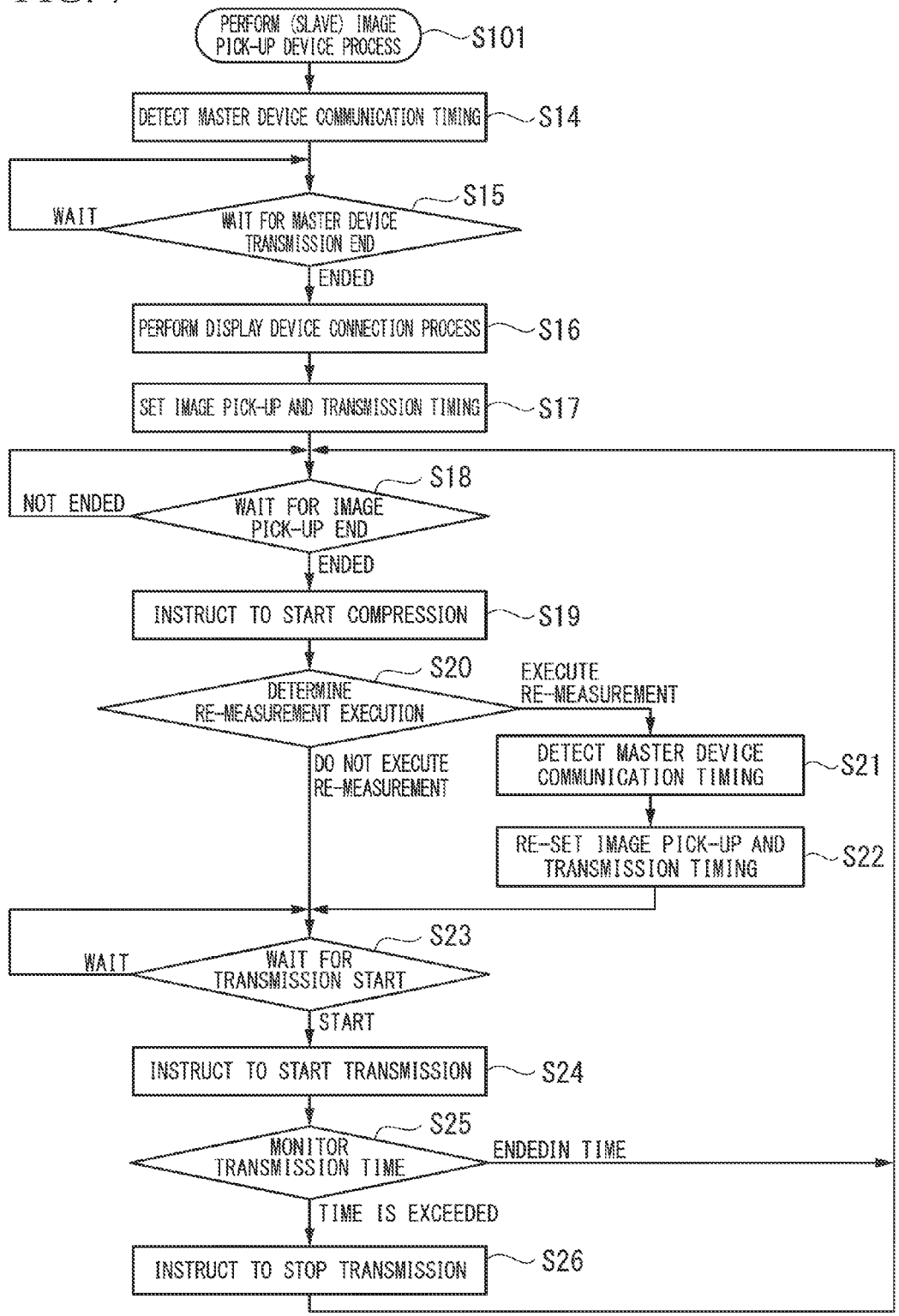
FIG. 7 is a flowchart representing the procedure of an operation of another image pick-up device that the image pick-up and display system according to the first embodiment of the present invention has.
Figure 8:
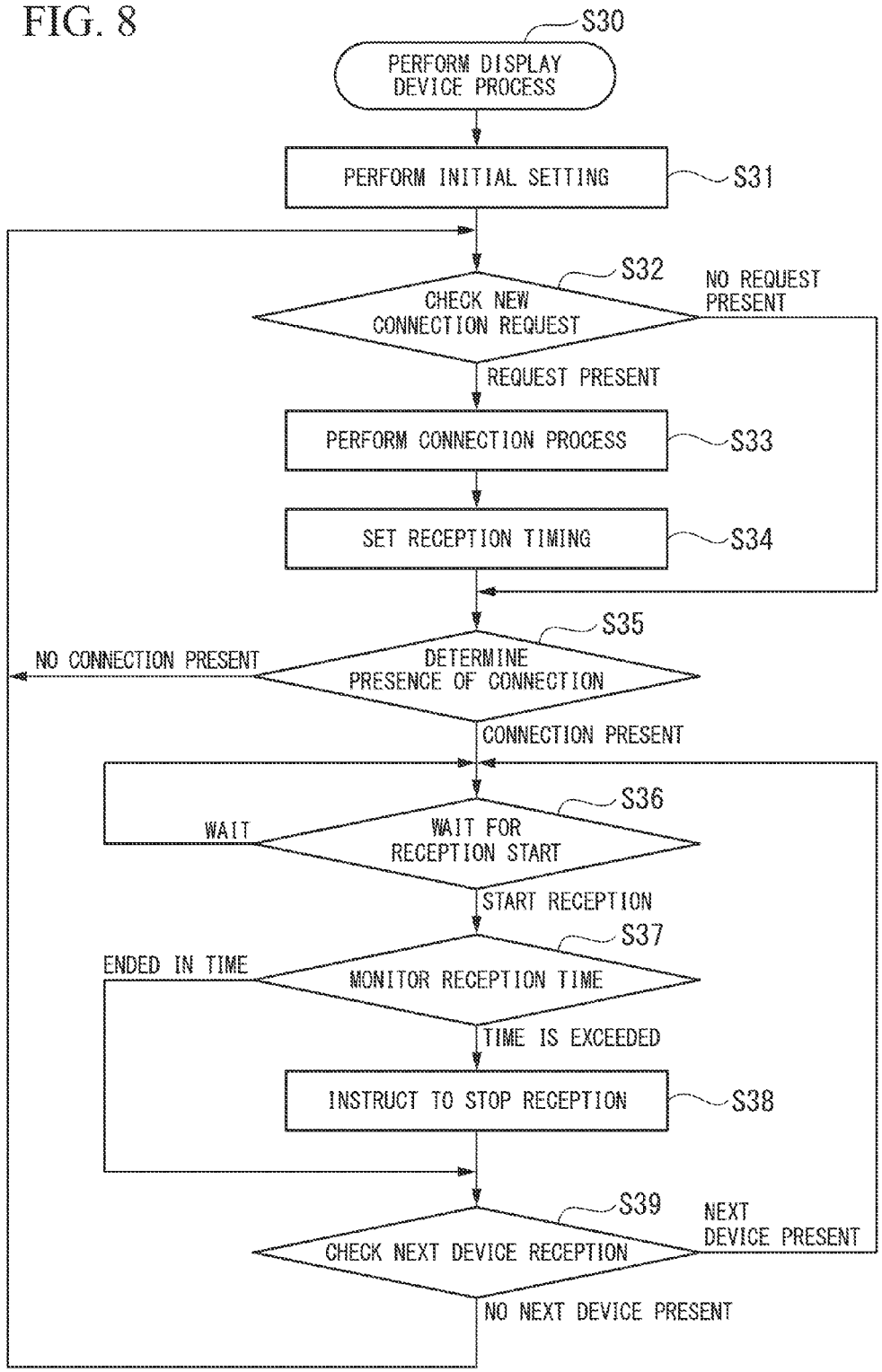
FIG. 8 is a flowchart representing the procedure of an operation of the display device that the image pick-up and display system according to the first embodiment of the present invention has.

FIGS. 5, 6, and 7 are flowcharts representing operations of the image pick-up devices. FIG. 5 represents a common operation performed in the "master" image pick-up device and the "slave" image pick-up device. FIG. 6 represents an operation of the "master" image pick-up device, and FIG. 7 represents an operation of the "slave" image pick-up device. FIG. 8 represents an operation of the display device 3. Hereinbelow, the operations of the image pick-up devices and the display device will be described using FIGS. 5 to 8.

The image pick-up devices 1 and 2 of the present embodiment have the same function, and one that is connected to the display device 3 first serves as the "master" image pick-up device. In the present description, an example in which an operation of the image pick-up device 2 is started while the image pick-up device 1 and the display device 3 perform wireless transmission will be described. In this case, the image pick-up device 1 is the "master."

As illustrated in FIG. 5, an initial setting (Step S2) is executed immediately after an operation of the image pick-up control circuit 8 of the image pick-up device 1 or 2 is started (Step S1). The initial setting (Step S2) is a process of performing initial settings of a register and the like which relate to various operations of the device.

Next, the image pick-up control circuit 8 executes communication state checking (Step S3). The communication state checking (Step S3) is a process of monitoring a state of radio waves in the periphery of the device by controlling the antenna 9, the high-frequency circuit 7, and the baseband circuit 6, and thereby it is found whether or not another image pick-up device communicates with the display device.

When no other image pick-up device is communicating with the display device, the image pick-up control circuit 8 determines "no communication detected" and then executes a master device setting (Step S4). The master device setting (Step S4) is a process of setting the image pick-up device to operate as a master device. Thereafter, the image pick-up device starts an operation as a "master" image pick-up device (Step S100). When the other image pick-up device is communicating with the display device, the image pick-up control circuit 8 determines "communication detected," and a slave device setting is executed (Step S13). The slave device setting (Step S13) is a process of setting the image pick-up device to operate as a "slave" image pick-up device. Thereafter, the image pick-up device starts operations as a "slave" image pick-up device (Step S101).

The operation of the image pick-up device 1 in the present embodiment will be described. Since the other image pick-up device is not communicating with the display device 3 when the image pick-up device 1 of the present description starts the operation, the master device setting (Step S4) is executed in the image pick-up device 1. As illustrated in FIG. 6, when the operation as the "master" image pick-up device is started (Step S100), the image pick-up control circuit 8 executes a display device connection process (Step S5). The display device connection process (Step S5) is a process of performing wireless connection with the display device 3. In the display device connection process (Step S5), various settings accompanied by the wireless connection (setting of a communication protocol and the like) are performed.

After the end of the display device connection process (Step S5), the image pick-up control circuit 8 executes an image pick-up and transmission timing setting (Step S6). The image pick-up and transmission timing setting (Step S6) is a process of setting a timing of image pick-up and wireless transmission to be executed by the image pick-up device 1, and setting each of the time points (t1 to t31) which are denoted as "operation time points of the image pick-up device 1" in FIG. 4.

To be specific, the image pick-up control circuit 8 causes a counter circuit to count a reference clock that has a predetermined frequency therein, generates a timing signal of a predetermined cycle (T) with reference to the counted value, and thereby generates each time point (t1 to t31). Since the technology for generating various timing signals in a predetermined cycle is well known, description thereof will be omitted.

When the image pick-up and transmission timing setting (Step S6) is performed, an operation of the image pick-up unit 4 is started. After the image pick-up and transmission timing setting (Step S6) is finished, the image pick-up control circuit 8 executes a wait for an image pick-up end (Step S7). The wait for an image pick-up end (Step S7) is a process of waiting for a start of the next process until the image pick-up unit 4 finishes image pick-up of one frame, and a waiting time is a time based on a value set in the image pick-up and transmission timing setting (Step S6).

When the image pick-up unit 4 finishes image pick-up, the image pick-up control circuit 8 executes compression start instructing (Step S8). The compression start instructing (Step S8) is a process of instructing the compression circuit 5 on a start of a compression operation. The image pick-up control circuit 8 also knows the timings of the compression process (from t3 to t5 and the like in FIG. 4), and executes a wait for a transmission start (Step S9) until the compression process ends. The wait for a transmission start (Step S9) is a process of waiting for a start of the next process until the compression circuit 5 finishes compression of one frame.

After the wait for a transmission start (Step S9) ends, the image pick-up control circuit 8 executes transmission start instructing (Step S10). The transmission start instructing (Step S10) is a process of instructing the baseband circuit 6 and the high-frequency circuit 7 on a start of wireless transmission. The baseband circuit 6 transmits compressed image data supplied from the compression circuit 5 to the display device 3 via the high-frequency circuit 7 and the antenna 9 using a predetermined transmission protocol according to the transmission start instructing (Step S10).

The image pick-up control circuit 8 executes transmission time monitoring (Step S11) after execution of the transmission start instructing (Step S10). Since the time for which wireless transmission is executed (t6 to t10, t16 to t19, or the like) is limited as described using FIG. 4, the image pick-up control circuit 8 measures the wireless transmission execution time through the transmission time monitoring (Step S11).

When wireless transmission ends within the limited time, it is determined as "ended in time" and the process returns to the wait for an image pick-up end (Step S7) and then the following process is executed. When wireless transmission is not finished within the limited time, the image pick-up control circuit 8 performs transmission stop instructing (Step S12), and transfers a transmission stop instruction to the baseband circuit 6 to cause the wireless transmission to stop. Then, the process returns to the wait for an image pick-up end (Step S7) and then the following process is executed. The operation described above is an operation performed by the image pick-up device 1 in the present embodiment.

Next, the operation of the image pick-up device 2 in the present embodiment will be described. As described above, the image pick-up device 2 starts the operation after the image pick-up device 1 and the display device 3 are connected to each other. In this case, the image pick-up control circuit 8 of the image pick-up device 2 detects communication between the image pick-up device 1 and the display device 3 in the communication state checking (Step S3) after the initial setting (Step S2) is performed. Then, the image pick-up control circuit 8 of the image pick-up device 2 determines the state as "communication detected," then executes a slave device setting (Step S13), and then starts the operation as a "slave" image pick-up device (Step S101).

When the operation as a "slave" image pick-up device (Step S101) is started, the image pick-up control circuit 8 executes a master device communication timing detection process (Step S14) as illustrated in FIG. 7. The master device communication timing detection process (Step S14) is a process of monitoring communication between the master device and the display device, and detecting the time point (t6 of FIG. 4) of a start of transmission from the master device.

Then, the image pick-up control circuit 8 performs a wait for a master device transmission end (Step S15) to wait for an end of communication between the master device and the display device. The wait for a master device transmission end (Step S15) is a process of waiting for a start of the next process until the communication between the master device and the display device is finished.

After the communication between the master device and the display device is finished, the image pick-up control circuit 8 executes a display device connection process (Step S16). The display device connection process (Step S16) is a process of performing wireless connection to the display device 3 like the display device connection process (Step S5). By performing the display device connection process (Step S16) after the communication between the master device and the display device is finished, a collision between wireless communication resulting from a connection process and wireless transmission of the master device is avoided.

After the display device connection process (Step S16) is finished, the image pick-up control circuit 8 executes an image pick-up and transmission timing setting (Step S17). The image pick-up and transmission timing setting (Step S17) is a process of setting a timing of image pick-up and wireless transmission executed by the image pick-up device 2, and setting each of the time points (t19 to t32) denoted as "operation time points of the image pick-up device 2" in FIG. 4.

In the image pick-up and transmission timing setting (Step S17), the image pick-up control circuit 8 decides timings at which the image pick-up device 2 executes an image pick-up process, a compression process, and wireless transmission with reference to the time point (t6) of a start of transmission of the master device detected in the master device communication timing detection process (Step S14). The image pick-up control circuit 8 of the image pick-up device 2 knows operation timings of each unit of the master device, and can know a timing of each operation by detecting the transmission start time point (t6). This is because the image pick-up device 2 operates at the timings of the master device when the image pick-up device 1 is not present.

The image pick-up control circuit 8 of the image pick-up device 2 stores data representing the temporal relation of each of an image pick-up end time point (t2) and transmission start and end time points (t6 and t10) of the image pick-up device 1 (temporal relation data) as described above. When the transmission start time point (t6) is detected by detecting the identifier indicating the image pick-up device 1, the image pick-up control circuit 8 can set an image pick-up end time point and a transmission start time point of the image pick-up device 2 using the stored data.

For example, when the image pick-up end time point (t2) is set to the time 3 ms earlier than the transmission start time point (t6) (a maximum time of the compression process is 3 ms) and a maximum transmission time (t6 to t10) is set to 6 ms, the image pick-up control circuit 8 of the image pick-up device 2 detects that the time point 3 ms earlier than the transmission start time point (t6) of the image pick-up device 1 is the image pick-up end time point (t2) when the transmission start time point (t6) of the image pick-up device 1 is detected, and sets the image pick-up end time point of the image pick-up device 2 at the same time point as the image pick-up end time point (t2). In addition, the image pick-up control circuit 8 of the image pick-up device 2 detects that the time point 6 ms later the transmission start time point (t6) of the image pick-up device 1 is the transmission end time point (t10) of the image pick-up device 1, and sets a transmission start time point of the image pick-up device 2 after the transmission end time point (t10). As a result, the image pick-up device 2 can perform image pick-up operations at the same time points as the image pick-up device 1, and execute wireless transmission operations at the time points different from those of the image pick-up device 1.

After the image pick-up and transmission timing setting (Step S17), the image pick-up control circuit 8 waits for an end of the image pick-up (Step S18), and executes compression start instructing (Step S19). Since the wait for an image pick-up end (Step S18) and the compression start instructing (Step S19) are the same processes as the above-described wait for an image pick-up end (Step S7) and the compression start instructing (Step S8), description thereof will be omitted.

As described above, the image pick-up device 2 detects the transmission start time point (t6) of the image pick-up device 1 to be in synchronization with operations of the image pick-up device 1; however, after a long period of time elapses, time points of the operations deviate due to unevenness in the frequencies of reference clocks that are used by the respective devices. For this reason, the image pick-up device 2 periodically detects the transmission start time point (t6) of the image pick-up device 1, resets time points inside the device using the detected time point, and thereby prevents a deviation in operation time points described above. The re-measurement execution determination (Step S20) in FIG. 7 is a process of determining whether or not re-measurement of the transmission start time point (t6) is executed, and the re-measurement is executed in a predetermined cycle.

When the re-measurement is executed, the image pick-up control circuit 8 executes master device communication timing detection (Step S21). The master device communication timing detection (Step S21) is the same process as the above-described master device communication timing detection process (Step S14) to detect a transmission start time point of the image pick-up device 1. Then, the image pick-up control circuit 8 sets various time points with reference to the detected transmission start time point by executing image pick-up and transmission time point resetting (Step S22), and thereby prevents such a deviation in operation time points.

When the image pick-up and transmission time point resetting (Step S22) has been performed and when re-measurement has been determined not to be executed in the re-measurement execution determination (Step S20), the image pick-up control circuit 8 executes a wait for a transmission start (Step S23). Since transmission start instructing (Step S24), transmission time monitoring (Step S25), and transmission stop instructing (Step S26) after the wait for a transmission start (Step S23) are the same processes as the wait for a transmission start (Step S9), the transmission start instructing (Step S10), the transmission time monitoring (Step S11), and the transmission stop instructing (Step S12) of FIG. 6, respectively, description thereof will be omitted.

Next, the operation of the display device 3 will be described using FIG. 8. Upon a start of the operation (Step S30), the display control circuit 16 of the display device 3 executes an initial setting process (Step S31). The initial setting process (Step S31) is a process of performing initial setting of a register and the like that relate to various operations of the device. A register that relates to displaying is also set in the initial setting process (Step S31), a display process is thereby started in a predetermined cycle, and an initial screen is displayed on the display unit 15.

After the end of the initial setting process (Step S31), the display control circuit 16 determines presence or absence of a new connection request in new connection request checking (Step S32). When there is a new connection request, the display control circuit 16 executes a connection process (Step S33) to execute a transmission and reception process with respect to various parameters that are accompanied by connection with an image pick-up device.

After the connection process (Step S33), the display control circuit 16 executes a reception timing setting process (Step S34). The reception timing setting process (Step S34) is a process of setting an execution time point of a communication process with respect to an image pick-up device that is connected in the connection process (Step S33) to set an execution time point so as to correspond to the time point requested from the image pick-up device in the connection process (Step S33).

When there is no new connection request and after the reception timing setting process (Step S34) has been finished, the display control circuit 16 executes a connection presence determination (Step S35) for determining presence or absence of connection with the image pick-up device. When there is no connection, the process returns to the new connection request checking (Step S32) and then the following process is executed. When there is connection, the display control circuit 16 performs a wait for a reception start (Step S36), and then waits for transmission from the image pick-up device.

The display control circuit 16 finishes the wait for a reception start (Step S36) when transmission from the image pick-up device has been started, and then executes reception time monitoring (Step S37). The reception time monitoring (Step S37) is a process of monitoring an execution time of a reception process. When duration of the reception process exceeds a predetermined maximum execution time, the display control circuit 16 determines that "the time is exceeded" and executes reception stop instructing (Step S38). The reception stop instructing (Step S38) is a process of transferring a reception stop instruction to the baseband circuit 12 to stop wireless reception.

When the reception process has been finished within the time, and after the execution of the reception stop instructing (Step S38), the display control circuit 16 executes next-device reception checking (Step S39). The next-device reception checking (Step S39) is a process of determining, for each frame, whether or not a reception process of transmission data from all image pick-up devices which are in connection to display an image on the display screen has been finished.

In the present embodiment, the display device 3 is connected to the image pick-up device 1 first, and then connected to the image pick-up device 2 as well. When the display device 3 is connected only to the image pick-up device 1, the display control circuit 16 monitors an end of the reception process of transmission data from the image pick-up device 1 in the reception time monitoring (Step S37), and executes the next-device reception checking (Step S39) when the reception process has ended. The display control circuit 16 recognizes the image pick-up device 1 as the only image pick-up device in connection, and determines "no next device present" at that time. When "no next device present" is determined, the process returns to the new connection request checking (Step S32), and then the following process is executed. The next-device reception checking (Step S39) is executed at, for example, the time point t7 in FIG. 4.

When the display device 3 is connected to the image pick-up devices 1 and 2, the next-device reception checking (Step S39) is executed when a reception process of transmission data from the image pick-up devices 1 and 2 has ended. When the reception process of transmission data from the image pick-up device 1 has ended, "next device present" is determined through the next-device reception checking (Step S39), the process returns to the wait for a reception start (Step S36), and then the following process is executed, and when the reception process of transmission data from the image pick-up device 2 has ended, "no next device present" is determined through the next-device reception checking (Step S39), the process returns to the new connection request checking (Step S32), and then the following process is executed. The next-device reception checking (Step S39) is executed at, for example, the time point t26 in FIG. 4 and "next device present" is determined, and then executed at the time point t30 and "no next device present" is determined.

When the image pick-up devices 1 and 2 are connected, their image pick-ups are performed at the same time points, then wireless transmission from the image pick-up device 1 is performed, and then wireless transmission from the image pick-up device 2 is performed as illustrated in FIG. 4. For this reason, in the next-device reception checking (Step S39) that is performed after the wireless transmission of the image pick-up device 1, the process returns to the wait for a reception start (Step S36), and in the next-device reception checking (Step S38) that is performed after the wireless transmission of the image pick-up device 2, the process returns to the new connection request checking (Step S32).

The image pick-up device 1 of the present embodiment corresponds to a benchmark image pick-up device of the main concept of the present invention, the image pick-up device 2 corresponds to an image pick-up device other than the benchmark image pick-up device of the main concept of the present invention, and the display device 3 corresponds to a display device of the main concept of the present invention. The benchmark image pick-up device of the present invention can be configured such that, for example, the image pick-up unit 4 is set as an image pick-up section, the compression circuit 5 is set as a data processing section, and the baseband circuit 6 and the high-frequency circuit 7 are set as a wireless communication section. In addition, the image pick-up device other than the benchmark image pick-up device of the present invention can be configured such that, for example, the image pick-up unit 4 is set as an image pick-up section, the compression circuit 5 is set as a data processing section, the baseband circuit 6 and the high-frequency circuit 7 are set as a wireless communication section, and the image pick-up control circuit 8 is set as a control section. In addition, the display device of the present invention can be configured such that, for example, the high-frequency circuit 11 and the baseband circuit 12 are set as a wireless communication section, and the display unit 15 is set as a display section.

When the benchmark image pick-up device of the main concept of the present invention is configured, the process performed by the image pick-up device other than the benchmark image pick-up device is not essential. Thus, the benchmark image pick-up device may be configured such that, for example, the process illustrated in FIG. 7 is not performed. In addition, when the image pick-up device other than the benchmark image pick-up device of the main concept of the present invention is configured, the process performed by the benchmark image pick-up device is not essential. Thus, the image pick-up device other than the benchmark image pick-up device may be configured such that, for example, the process illustrated in FIG. 6 is not performed.

According to the present embodiment, the image pick-up timings of the master image pick-up device (image pick-up device 1) are detected by the slave image pick-up device (image pick-up device 2) based on the transmission timings of the master image pick-up device as described above, and the slave image pick-up device can control its image pick-up timings to be the same as those of the master image pick-up device, and can control its transmission timings to be different from those of the master image pick-up device. For this reason, image pick-up timings and wireless transmission timings of a plurality of image pick-up devices can be adjusted without wirelessly communicating special information for being in synchronization.

Second Embodiment

Next, a second embodiment of the present invention will be described. An image pick-up device of the present embodiment has an image combining function of receiving an image from another image pick-up device, combining the received image with an image picked up by the device itself, and transmitting the one combined image to a display device. In addition, the display device of the present embodiment has a notification function of detecting a display delay time from a reception start timing of image data from the image pick-up device and a display start timing of the device itself, and then notifying the image pick-up device of an adjustment time that is the difference between a target delay time and the detected display delay time. As the image pick-up device adjusts an image pick-up timing based on the adjustment time notified of by the display device, the display delay time can be controlled to be the shortest.

Figure 9:
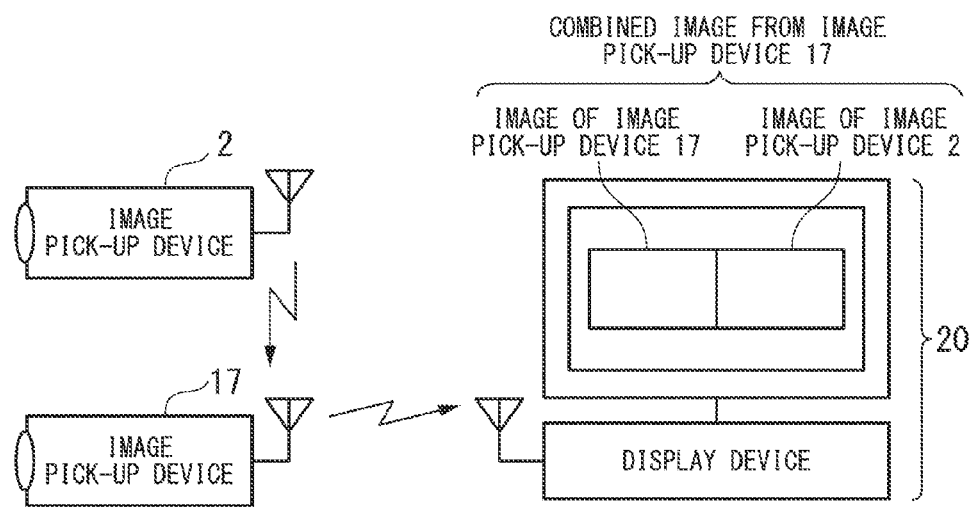
FIG. 9 is a block diagram representing a configuration of an image pick-up and display system according to a second embodiment of the present invention.

FIG. 9 represents a configuration of an image pick-up and display system according to the present embodiment. First, an overview of the image pick-up and display system will be described using FIG. 9. The image pick-up and display system illustrated in FIG. 9 is constituted by two image pick-up devices (image pick-up devices 17 and 2) and one display device (display device 20).

In the present embodiment, the functions of the image pick-up device 17 and the display device 20 are partly different from those of the image pick-up device 1 and the display device 3 of the first embodiment. Since the display device 20 has the same internal configuration as the display device 3 with only a partial function added thereto, the display device 20 of the present embodiment will be described using the configuration of the display device 3 of FIG. 3.

As illustrated in FIG. 9, the image pick-up device 2 is connected to the image pick-up device 17, and then transmission data that includes data of an image picked up by the image pick-up device 2 is wirelessly transmitted to the image pick-up device 17. The data of the image picked up by the image pick-up device 2 and data of an image picked up by the image pick-up device 17 are combined by the image pick-up device 17, transmission data that includes the combined data is wirelessly transmitted to the display device 20, and thereby a combined image is displayed on the display device 20. In addition, the image pick-up device 17 that has the function of connecting itself to another image pick-up device operates as a "master," and the image pick-up device 2 operates as a "slave" that conforms its timings of image pick-up processes to the "master."

Figure 10:
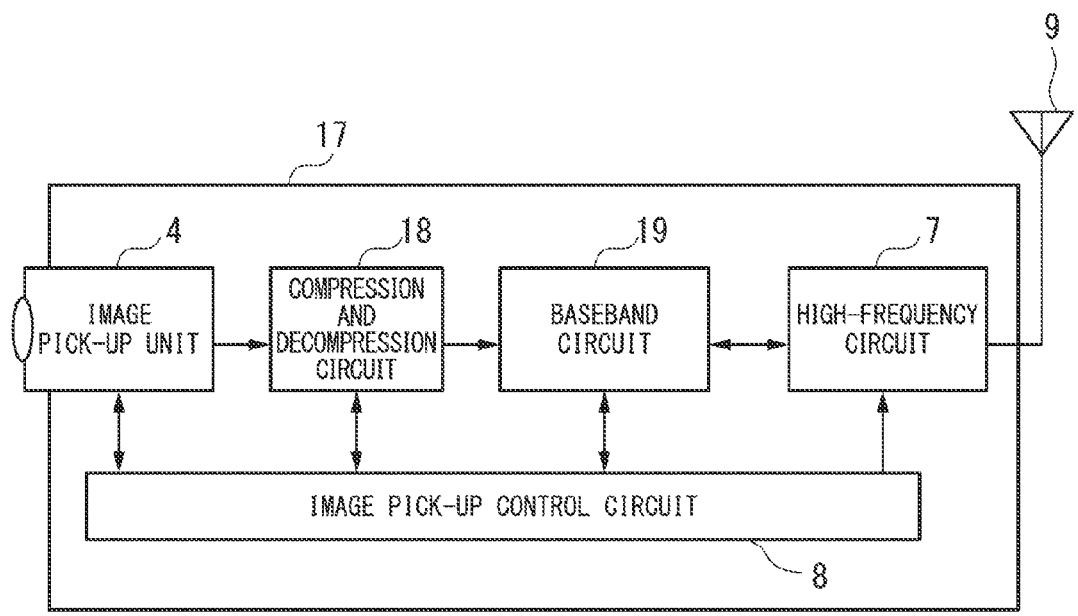
FIG. 10 is a block diagram representing a configuration of an image pick-up device that the image pick-up and display system according to the second embodiment of the present invention has.

FIG. 10 represents a configuration of the image pick-up device 17. Since a configuration of the image pick-up device 2 of the present embodiment is the same as that of the image pick-up device 2 of the first embodiment, the configuration of the image pick-up device 2 will not be described. The image pick-up device 17 is constituted by the image pick-up unit 4, a compression and decompression circuit 18, a baseband circuit 19, the high-frequency circuit 7, the image pick-up control circuit 8, and the antenna 9 as illustrated in FIG. 10. This constitution is different from that of the image pick-up device 1 of the first embodiment in that the compression and decompression circuit 18 and the baseband circuit 19 are provided.

The baseband circuit 19 has functions of executing a connection process with respect to another image pick-up device and outputting compressed image data received from the other image pick-up device to the compression and decompression circuit 18, which are added to the function that the baseband circuit 12 of the first embodiment. The compression and decompression circuit 18 (image combining section) is different from the compression circuit 5 of the first embodiment in that it has functions of performing a decompression process on compressed image data from the other image pick-up device output from the baseband circuit 19, performing a process of combining image pick-up data that has undergone the decompression process with image pick-up data output from the image pick-up unit 4 of the image pick-up device 17, and then generating compressed image data by performing a compression process on the image pick-up data that has undergone the combining process, and outputting the data to the baseband circuit 19.

Figure 11:
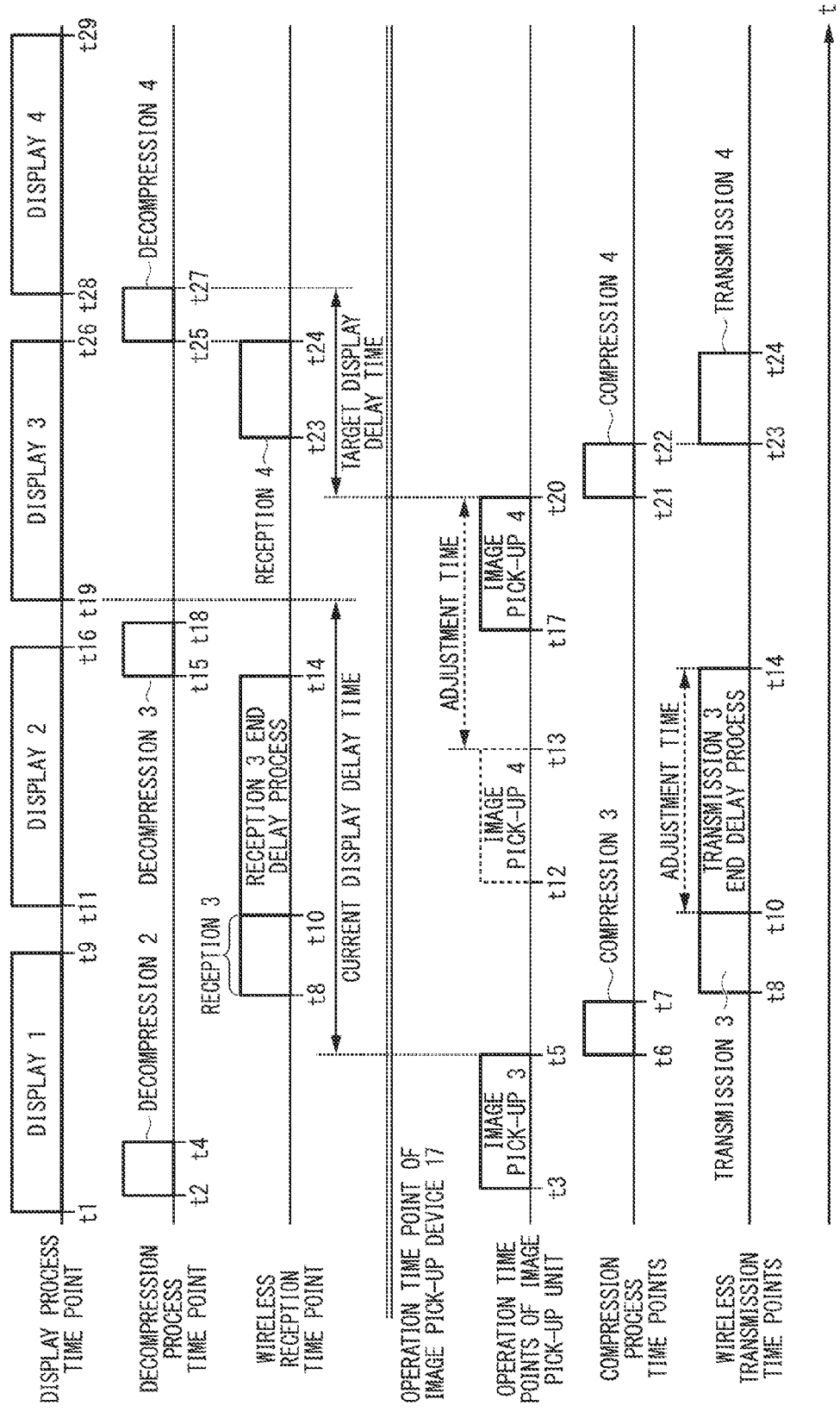
FIG. 11 is a timing chart representing an operation of a display device and the image pick-up device relating to adjustment of a display delay time according to the second embodiment of the present invention.

Next, an operation of the display device 20 and the image pick-up device 17 which relates to adjustment of a display delay time in the present embodiment will be described using FIG. 11. FIG. 11 represents an adjustment process of a display delay time performed by the display device 20 with respect to the image pick-up device 17. The right direction of FIG. 11 is the direction in which time progresses. The state illustrated in FIG. 11 is a state before the image pick-up device 17 is connected to the image pick-up device 2. Connection of the image pick-up device 17 to the image pick-up device 2 is performed after the display delay time which will be described using FIG. 11 is adjusted. The state of the connection of the image pick-up device 17 to the image pick-up device 2 will be described later using FIG. 12.

The display device 20 performs a display process in a predetermined display cycle after initial setting is performed, like the display device 3 of the first embodiment.

The time from t1 to t11 (t11 to t19 or t19 to t28) of FIG. 11 is the time of one cycle, the time from t1 to t9 (t11 to t16, t19 to t26, or t28 to t29) is a display period, and the time from t9 to t11 (t16 to t19, or t26 to t28) is a blanking period. FIG. 11 illustrates that the display device 20 and the image pick-up device 17 transition from a state before adjustment of the display delay time to a state after adjustment of the display delay time. The adjustment of the display delay time is executed by adjusting an image pick-up timing of the image pick-up device 17 in accordance with a display timing of the display device 20.

First, measurement of the display delay time performed by the display device 20 will be described. The display delay time is a period after execution of an image pick-up process by an image pick-up device before execution of a display process by the display device. In the present embodiment, the display delay time will be defined as a time from a time point at which an image pick-up process of an image pick-up device ends to a time point at which display of the display device starts in the following description. Image pick-up data obtained through the image pick-up process by the image pick-up device 17 undergoes a compression process and a transmission process, and then is transferred to the display device 20. In the display device 20, a display process is performed after a reception process and a decompression process.

As illustrated in FIG. 11, the processes from the image pick-up process to the decompression process are a series of processes that starts from an end of the image pick-up process, and the display process is performed at another timing. For example, an image pick-up process (t3 to t5), a compression process (t6 to t7), wireless transmission and wireless reception (t8 to t14), and a decompression process (t5 to t18) are set as the series of processes. In addition, after the decompression process (t5 to t18), the display process (t16 to t26) is performed, and thereby an image is displayed. The time from the end time point (t5) of the image pick-up process to the start time point (t19) of the display process is illustrated as a current display delay time.

A condition for causing the display delay time to be the shortest is that the decompression process end immediately before the start of the display process. In order to fulfill the condition, the display control circuit 16 of the display device 20 detects a start time point (t8) of reception of the baseband circuit 12, detects a start time point (t19) of display of the display processing circuit 14, and detects the current display delay time (t5 to t19) in the present embodiment. As illustrated in FIG. 11, the compression time (t6 to t7) is known, the compression process is started immediately after the end of image pick-up (t5=t6), wireless reception is started immediately after the end of the compression process (t7=t8), and thus the image pick-up process end time point (t5) can be estimated from the reception start time point (t8). By obtaining the time difference between the image pick-up process end time point (t5) and the display start time point (t19), the current display delay time can be obtained.

Since the target display delay time that is the shortest display delay time is known, the display control circuit 16 (computation section) computes an adjustment time by performing an arithmetic operation (subtraction) of "(Current display delay time)−(Target display delay time)." In the present embodiment, the target display delay time is stored in the display control circuit 16.

It is also possible to make an adjustment time into data and notify the image pick-up device 17 of the data; however, in the present embodiment, the display device 20 notifies the image pick-up device 17 of the aforementioned adjustment time using a method of delaying an end timing of a transmission process of the image pick-up device 17 by the adjustment time. To be specific, the baseband circuit 19 of the image pick-up device 17 divides compressed image data into a plurality of pieces of data (divided pieces of image pick-up data) after a compression process, and transmits a plurality of packets that include the pieces of data. By delaying an end of a reception process of the display device 20 with respect to the transmitted final packet, the image pick-up device 17 is notified of the adjustment time.

Since the method for dividing data into a plurality of packets and transmitting them is well known, description thereof will be omitted. Furthermore, as data representing the final packet is stored in the final packet among the plurality of packets transmitted from the image pick-up device 17, when the data has been detected from the packet, the display control circuit 16 of the display device 20 detects that the packet is the final packet.

The period from t10 to t14 in FIG. 11 is the timing at which notification of the adjustment time is executed. The display control circuit 16 of the display device 20 notifies the image pick-up device 17 of the adjustment time that is the difference between the current display delay time and the target display delay time of the drawing, and thereby performs a process of changing the image pick-up timing of the image pick-up device 17 from the period of t12 to 13 to the period of t17 to t20 denoted as "Image pick-up 4" in the drawing.

To be specific, the image pick-up process of the image pick-up device 17 is controlled to be finished at the time point (the time point of t13 or t20) that comes when a predetermined period of time has elapsed from the end of wireless transmission, and thus, by setting the end time point of the wireless transmission to be the time point (t14) by delaying the original time point (t10) by the adjustment time, the timing of the image pick-up process is adjusted from the period of t12 to t13 to the period of t17 to t20

In FIG. 11, wireless transmission ("Transmission 3") that is executed in the period of t8 to t10 in normal communication is stopped at the time point t10. In the present embodiment, the image pick-up device 17 and the display device 20 agree in advance on performing notification of the adjustment time. The wireless transmission is not stopped at the time point t10, communication is extended to t14 by delaying the time point the adjustment time, and thereby notification of the adjustment time is performed. To be specific, even if the display control circuit 16 of the display device 20 succeeds in receiving the final packet transmitted from the image pick-up device 17 which corresponds to one time (one frame) of image pick-up, it does not reply with ACK (reception completion data) that indicates successful reception, but controls the high-frequency circuit 11 and the baseband circuit 12 to continue replying with NAK each time the packet is received.

When NAK is received from the display device 20, the image pick-up control circuit 8 of the image pick-up device 17 controls the baseband circuit 19 and the high-frequency circuit 7 so as to re-transmit the final packet. While notification of the adjustment time is being performed, the image pick-up control circuit 8 controls the image pick-up unit 4 not to start the image pick-up process ("Image pick-up 4" of FIG. 11). The display control circuit 16 of the display device 20 controls the high-frequency circuit 11 and the baseband circuit 12 to finish the communication by replying with ACK when the adjustment time has elapsed from the start of the reception of the final packet transmitted from the image pick-up device 17 corresponding to the one time (one frame) of image pick-up. With the reply of ACK from the display device 20 to the image pick-up device 17, the image pick-up device 17 is notified of the adjustment time. The image pick-up control circuit 8 of the image pick-up device 17 recognizes the adjustment time by measuring the time from the time point at which the final packet has been transmitted to the time point at which ACK has been received.

The image pick-up control circuit 8 of the image pick-up device 17 adjusts the end time point of the image pick-up process in accordance with the adjustment time as illustrated in FIG. 11. In FIG. 11, the end time point of the image pick-up process is adjusted to t20 obtained by delaying t13 by the adjustment time. As a result, the display delay time is adjusted to the target display delay time.

Finally, a method for an image combining process performed by the image pick-up device 17 will be described using FIG. 12. FIG. 12 represents time points of processes performed by the image pick-up device 17 and the image pick-up device 2 when, while the image pick-up device 17 is connected to the display device 20, the image pick-up device 2 is newly connected to the image pick-up device 17. The right direction of FIG. 12 is the direction in which time progresses.

In this case, the image pick-up device 2 adjusts its image pick-up timings to be the same as those of the image pick-up device 17 and adjusts transmission timings so as to perform wireless transmission to the image pick-up device 17 at predetermined timings as in the first embodiment. In addition, the image pick-up device 17 receives image pick-up data from the image pick-up device 2, combines the data with its own image pick-up data, and then transmits the combined data to the display device 3.

First, an operation of the image pick-up device 17 while the image pick-up device 2 is not connected thereto will be described. Furthermore, it is assumed that a connection process between the display device 20 and the image pick-up device 17 has been completed and adjustment of the display delay time described using FIG. 11 has also been finished. The image pick-up operation of the image pick-up device 17 is performed in a predetermined cycle (T: 16.67 ms=1/60 seconds), and the periods of t30 to t31, t32 to t35, t39 to t43, and t50 to t54 each indicate a period in which the image pick-up unit 4 perform an image pick-up process. The time points (t31, t35, t43, and t54) at which the image pick-up processes end in the drawing mark the predetermined image pick-up cycle, and the head time points (t30, t32, t39, and t50) of the periods of the image pick-up processes are variable according to an exposure period that is set by the image pick-up unit 4.

When an image pick-up process ends, image pick-up data is transferred to the compression and decompression circuit 18 after a predetermined period of time, and then a compression process is performed. A processing time of the compression process varies according to a state of image pick-up data. FIG. 12 illustrates times (t32 to t33, t40 to t41, and t51 to t52) when the longest compression processes are performed. Since the image pick-up device 2 has not been connected in the compression process, partial data that will be combined with image pick-up data of the image pick-up device 2 is replaced with black image data and then processed.

In addition, each unoccupied time (t31 to t32 and t35 to t40) from the end of each image pick-up process to the compression process is a processing time necessary for a reception process and a decompression process of the data from the image pick-up device 2 when the image pick-up device 2 is connected. Execution timings of the respective processes when the image pick-up device 2 is connected will be described later in detail. Wireless transmission (t34 to t36) is started immediately after the end (t33) of the compression process. In FIG. 12, data whose image has been picked up at the timing denoted as "Image pick-up 1" is wirelessly transmitted at the timing denoted as "Transmission 1." Likewise, data whose image has been picked up at the timing denoted as "Image pick-up 2" is wirelessly transmitted at the timing denoted as "Transmission 2," and data whose image has been picked up at the timing denoted as "Image pick-up 3" is wirelessly transmitted at the timing denoted as "Transmission 3."

Next, connection between the image pick-up device 2 and the image pick-up device 17 will be described. Before starting connection, the image pick-up device 2 receives transmission data transferred in wireless communication ("Transmission 1" (t34 to t36) in FIG. 12) between the image pick-up device 17 and the display device 20 to find the operation timing of the image pick-up device 17 as in the first embodiment, adjusts its image pick-up timing to be the same as that of the image pick-up device 17 (performs a synchronization process), and then executes a connection process (t37 to t38) after the end of the wireless transmission of the image pick-up device 17. Since details of the synchronization process of the image pick-up timing and the connection process are the same as in the first embodiment, description thereof will be omitted.

Finally, an operation of the image pick-up device 17 after the end of the connection process with respect to the image pick-up device 2 will be described. As described above, the image pick-up processes of the image pick-up device 2 are adjusted to be executed at the same time as the image pick-up processes of the image pick-up device 17. FIG. 12 illustrates an example in which the image pick-up process of the image pick-up device 2 is performed at the timing of "Image pick-up 3" (t39 to t43).

The image pick-up device 2 executes the compression process (t44 to t46) immediately after the image pick-up process (t39 to t43), and executes wireless transmission (t47 to t48) with respect to the image pick-up device 17 immediately after the compression process. After wireless reception (t47 to t48) of transmission data from the image pick-up device 2, the high-frequency circuit 7 of the image pick-up device 17 converts the frequency of the transmission data, and the baseband circuit 19 thereof reconfigures the transmission data to obtain compressed image data and then outputs the data to the compression and decompression circuit 18. The compression and decompression circuit 18 returns the compressed image data to general image pick-up data through a decompression process (t49 to t51), and combines the data with image pick-up data generated from the image pick-up process ("Image pick-up 3" (t39 to t43)) by the image pick-up unit 4. Then, the compression and decompression circuit 18 performs a compression process (t51 to t52) to generate compressed image data in which images of two screens have been combined. Note that, since a combining process is performed based on control of a data writing position in the course of a decompression process, the combining process is displayed as being included in the decompression process in FIG. 12. After the end of the compression process (t51 to t52), the baseband circuit 19 executes a transmission process (t53 to t56) with respect to the display device 20.

According to the present embodiment, by adjusting the execution timings of the image pick-up processes performed by the image pick-up device based on the adjustment time decided by the display device as described above, it is possible to control the display delay time which is a time taken from image pick-up to display to be the shortest.

In addition, in a situation of wireless communication in which no communication error occurs, by delaying the end timing of transmission of the final packet among a plurality of packets that include pieces of data obtained by dividing image pick-up data that is generated in one time (one frame) of image pick-up according to an adjustment time, the image pick-up device can detect the adjustment time. Further, notification of an adjustment time can be performed through wireless communication using a general protocol.

In addition, as the master image pick-up device transmits image pick-up data generated by combining image pick-up data of the slave image pick-up device with image pick-up data of the master image pick-up device, a combined image can be displayed with no need for the display device to perform a special process. Accordingly, even if the display device is a standard mobile terminal, reception and display of a combined image are possible.

Hereinabove, although the embodiments of the present invention have been described with reference to the drawings, a specific configuration is not limited to the above-described embodiments, and modifications in design made within the scope not departing from the gist of the present invention are also included therein.

The present invention can be broadly applied to image pick-up and display systems, image pick-up devices, image pick-up methods, programs, and the like, and, in an image pick-up device other than a benchmark image pick-up device, image pick-up timings and wireless transmission timings between the plurality of image pick-up devices can be adjusted without wirelessly communicating special information for being in synchronization by adjusting an image pick-up timing of an image pick-up section so that it matches an image pick-up timing of the benchmark image pick-up device and adjusting a wireless transmission timing of a first wireless communication section so that it is different from a wireless transmission timing of the benchmark image pick-up device based on temporal relation data that indicates a temporal relation between the image pick-up timing of the benchmark image pick-up device and the wireless transmission timing of compressed image data of the benchmark image pick-up device, and a reception timing of the compressed image data wirelessly received by the first wireless communication section.

What is claimed is:

1. An image pick-up and display system comprising:
   a plurality of image pick-up devices each of which executes image pick-up in a predetermined image pick-up cycle, and generates image pick-up data and wirelessly transmits compressed image data that corresponds to the image pick-up data each time image pick-up is performed; and
   a display device which wirelessly receives the wirelessly transmitted compressed image data and displays an image based on the compressed image data,
   wherein, when one of the plurality of image pick-up devices is defined as a benchmark image pick-up device, the benchmark image pick-up device has an image pick-up section which executes image pick-up in a predetermined image pick-up cycle, and generates and outputs the image pick-up data each time image pick-up is performed, a data processing section which generates the compressed image data from the image pick-up data output from the image pick-up section, and a first wireless communication section which wirelessly transmits the compressed image data generated by the data processing section in a predetermined transmission cycle,
   wherein the image pick-up device other than the benchmark image pick-up device has the image pick-up section, the data processing section, the first wireless communication section which further wirelessly receives the compressed image data wirelessly transmitted from the benchmark image pick-up device, and a control section which stores temporal relation data that indicates a temporal relation between an image pick-up timing of the benchmark image pick-up device and a wireless transmission timing of the compressed image data of the benchmark image pick-up device, adjusts an image pick-up timing of the image pick-up section so that the timing matches the image pick-up timing of the benchmark image pick-up device and adjusts a wireless transmission timing of the first wireless communication section so that the timing is different from the wireless transmission timing of the benchmark image pick-up device based on the temporal relation data and a reception timing of the compressed image data wirelessly received by the first wireless communication section, and wherein the display device has a second wireless communication section which wirelessly receives the compressed image data wirelessly transmitted from the image pick-up device, and a display section which displays an image based on the compressed image data wirelessly received by the second wireless communication section in a predetermined display cycle.

2. The image pick-up and display system according to claim 1, wherein the first wireless communication section of the benchmark image pick-up device wirelessly receives, from the display device, reception completion data representing that the image pick-up data corresponding to one time of image pick-up has been wirelessly received by the display device, wherein, when the reception completion data has been received by the first wireless communication section after the one time of image pick-up has been performed, the image pick-up section of the benchmark image pick-up device performs next image pick-up, wherein the display device further has a computation section that computes an adjustment time of an image pick-up timing of the image pick-up section of the benchmark image pick-up device based on a display timing at which the image pick-up data corresponding to the one time of image pick-up of the image pick-up section of the benchmark image pick-up device is displayed by the display section and a reception timing of the image pick-up data wirelessly received by the second wireless communication section, and wherein the second wireless communication section wirelessly transmits the reception completion data to the benchmark image pick-up device at a timing according to the computed adjustment time.

3. The image pick-up and display system according to claim 2, wherein the second wireless communication section of the display device wirelessly transmits, to the benchmark image pick-up device, data representing successful reception of a wireless packet that has been finally wirelessly transmitted from the benchmark image pick-up device among wireless packets including divided image pick-up data obtained by dividing the image pick-up data corresponding to the one time of image pick-up of the image pick-up section of the benchmark image pick-up device into a plurality of pieces, as the reception completion data.

4. The image pick-up and display system according to claim 3, wherein the second wireless communication section of the display device wirelessly transmits ACK data to the benchmark image pick-up device as the reception completion data.

5. The image pick-up and display system according to claim 4, wherein, after successfully wirelessly receiving the wireless packet that has been finally wirelessly transmitted from the benchmark image pick-up device, the second wireless communication section of the display device wirelessly transmits NAC data to the benchmark image pick-up device each time the wireless packet re-transmitted from the benchmark image pick-up device is received until the ACK data is wirelessly transmitted.

6. The image pick-up and display system according to claim 1, wherein the first wireless communication section of the image pick-up device other than the benchmark image pick-up device wirelessly transmits the image pick-up data to the benchmark image pick-up device, wherein the benchmark image pick-up device further has an image combining section that combines the image pick-up data output from the image pick-up section and the image pick-up data wirelessly received by the first wireless communication section, and wherein the first wireless communication section of the benchmark image pick-up device wirelessly receives the image pick-up data wirelessly transmitted from the image pick-up device other than the benchmark image pick-up device and wirelessly transmits the image pick-up data combined by the image combining section to the display device.

7. The image pick-up and display system according to claim 6, wherein the image combining section of the benchmark image pick-up device combines the image pick-up data output from the image pick-up section and the image pick-up data wirelessly received by the first wireless communication section within the same period as the image pick-up cycle in which the former image pick-up data is generated.

* * * * *